3,706,547
COMBATING WEEDS WITH THIENYL THIOCYANATES
Natu R. Patel, Shawnee Mission, Kans., assignor to Gulf Research & Development Company, Pittsburgh, Pa.
No Drawing. Filed Sept. 14, 1970, Ser. No. 72,189
Int. Cl. A01n 9/18
U.S. Cl. 71—90       2 Claims

ABSTRACT OF THE DISCLOSURE

5 - chloro- and 5 - methyl - 2 - thienyl thiocyanates, made by reaction of the corresponding substituted thiophenes with thiocyanogen, are useful as post-emergent herbicides, particularly to combat such undesired vegetation as pigweed and wild mustard.

DESCRIPTION OF THE INVENTION

Some weeds, such as the various strains of pigweed grow almost any place in the temperate zone in which crops are raised. There is a need for rather specific herbicides to combat severe infestations of these weeds without substantial danger of injury to the crops. I have discovered that 5-chloro-2-thienyl thiocyanate and 5-methyl-2-thienyl thiocyanate are particularly effective in post-emergent control of a small class of pestiferous weeds, including pigweed and wild mustard with minimum injury to sugar beets, peanuts, grain crops and pasture grasses. Because of the highly selective character of the herbicidal action, these compounds are useful in herbicide combinations, in which overlapping selectivity patterns usually increase the risk of crop injury.

SYNTHESIS OF THE HERBICIDES

These compounds may be prepared by the method of F. M. Stoyanovich, G. J. Gorushkina, and Ya. L. Goldfarb, Izv. Akad. Nauk SSSR, Ser. Khim., 1969, (2), 287–92 (Russ.) from Chem. Abstr., 71, 3198 (1969), according to the following scheme:

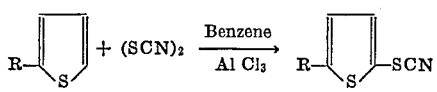

A specific procedure is exemplified below.

PREPARATION OF 5-CHLORO-2-THIENYL THIOCYANATE

In a three-necked, five-liter, round-bottomed flask, fitted with a mechanical stirrer, calcium chloride drying tube and an additional funnel, 390 g. (1.2 moles) of lead thiocyanate in 2500 ml. of dry benzene was suspended and cooled to about 5° C. in an ice bath. To this stirred mixture, a solution of 196 g. bromine (1.2 moles) in 400 ml. of dry benzene was added in portions during 90 minutes. The resulting clear thiocyanogen solution was filtered into another five-liter flask fitted with a magnetic stirrer containing 148.2 g. (1.25 moles) of 2-chlorothiophene and was cooled to about 5° C. under dry conditions. To this magnetically-stirred solution, 9.6 g. dry aluminum chloride was added in parts at 5–10° C. The temperature of the mixture was allowed to increase to 20° C. and the mixture was stirred at this temperature for 2½ hours. To this mixture 350 ml. of water was added and filtered through Celite. The benzene layer was separated and evaporated to a low volume, filtered again to remove thiocyanogen polymer and after removal of benzene, the liquid weighed 133 g. It was then distilled at 136–38° to about 18 mm. pressure to give a pale yellow liquid distillate. 5-methyl-2-thienyl thiocyanate, made by a similar procedure, exhibits a boiling point of 130° C. at 16 mm. pressure.

USE OF THE HERBICIDES

Because the herbicidal compounds are liquids, they are easily formulated as dispersible concentrates, employing conventional solvents and surface active agents. If desired, they may also be sprayed in concentrated form, using concentrated aqueous dispersions or solutions in organic solvents and low spray volumes, in the manner which has come into favor recently, so as to avoid carrying large spray tanks through the field. The method of use is illustrated in the following description of greenhouse tests.

Twenty-four species of plants were planted in 2½ inch square fertilizer-impregnated paper containers in a greenhouse. After the plants had emerged and grown to a height of 2 to 6 inches a portion of the plants were sprayed with an aqueous spray mixture made by adding emulsifier to the active ingredient and diluting with water, employing application rates of both 2 lb. per acre and 1 lb. per acre. After about 15 days the effect of the herbicide on the plants was evaluated by a comparison with a group of plants which had been grown under essentially the same conditions but had had only water applied to them instead of the spray mixture containing herbicide. The results were rated according to the following schedule:

4—all plants died
3—severe injury to all plants, some died
2—all plants injured, some died
1—observable injury to some plants, complete recovery probable
0—no observable effect.

The results are tabulated below.

HERBICIDAL USE OF SUBSTITUTED THIENYL THIOCYANATES

| | Herbicide | | | |
| --- | --- | --- | --- | --- |
| | 5-methyl compound | | 5-chloro compound | |
| Rate, lb./a | 2 | 1 | 2 | 1 |
| Plant species: | | | | |
| Pigweed | 4 | 4 | 4 | 3 |
| Lambsquarters | 4 | 2 | 4 | 2 |
| Crabgrass | 0 | 0 | 1 | 0 |
| Downy brome | 0 | 0 | 1 | 0 |
| Giant foxtail | 0 | 0 | 1 | 0 |
| Nutsedge | 0 | 0 | 0 | 0 |
| Peanut | 1 | 0 | 1 | 0 |
| Cotton | 4 | 3 | 2 | 2 |
| Tomato | 4 | 2 | 3 | 1 |
| Sugar beet | 1 | 1 | 1 | 1 |
| Wild buckwheat | 3 | 1 | 3 | 1 |
| Wild mustard | 4 | 4 | 4 | 4 |
| Cocklebur | 3 | 1 | 2 | 1 |
| Morning glory | 3 | 1 | 3 | 2 |
| Soybean | 3 | 2 | 3 | 2 |
| Barnyard grass | 0 | 0 | 1 | 0 |
| Green foxtail | 1 | 0 | 1 | 0 |
| Alfalfa | 2 | 1 | 2 | 1 |
| Corn | 0 | 0 | 1 | 0 |
| Grain sorghum | 1 | 0 | 1 | 0 |
| Shattercane | 1 | 0 | 1 | 0 |
| Wheat | 1 | 0 | 1 | 0 |
| Wild oats | 1 | 0 | 1 | 0 |
| Rice | 1 | 0 | 3 | 2 |

The test results tabulated above serve to demonstrate the relative toxicity of the herbicides to common plant species. It can be readily seen from these data that although these substances control pigweed and wild mustard, the risk of injury to many other plants is relatively small, particularly at low rates of application.

I claim:
1. The method of combating unwanted vegetation comprising applying post-emergently to the locus of the vegetation an effective amount of a compound having the structural formula

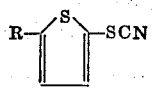

in which the substituent represented by R is selected from the groups consisting of methyl and chloro substituents.

2. A weed control composition consisting essentially of an effective amount of 5-chloro-2-thienyl thiocyanate and a quantity of an emulsifier sufficient to disperse the composition in water.

References Cited
UNITED STATES PATENTS 3,536,473   10/1970   Popoff et al. _____ 71—90
2,562,988   8/1951    McCleary _____ 260—332.5

FOREIGN PATENTS 1,488,625   6/1967    France _____ 71—90

LEWIS GOTTS, Primary Examiner
C. L. MILLS, Assistant Examiner

U.S. Cl. X.R.
260—332.5